United States Patent
Ma et al.

(10) Patent No.: US 8,121,043 B2
(45) Date of Patent: Feb. 21, 2012

(54) APPROACH FOR MANAGING THE CONSUMPTION OF RESOURCES USING ADAPTIVE RANDOM SAMPLING

(75) Inventors: Xiaoxue Ma, Sunnyvale, CA (US); Paul Gleichauf, Saratoga, CA (US); Ganesh Sadasivan, Fremont, CA (US); Sunil Khaunte, Mountain View, CA (US); Paul Aitken, Peebleshire (GB)

(73) Assignee: Cisco Technology, Inc., San Jose, CA (US)

( * ) Notice: Subject to any disclaimer, the term of this patent is extended or adjusted under 35 U.S.C. 154(b) by 1121 days.

(21) Appl. No.: 11/207,270

(22) Filed: Aug. 19, 2005

(65) Prior Publication Data

US 2007/0041331 A1    Feb. 22, 2007

(51) Int. Cl.
*G06F 11/30* (2006.01)
(52) U.S. Cl. ......................................................... 370/252
(58) Field of Classification Search .................. 370/235, 370/252, 389, 392, 400, 401; 709/223–225
See application file for complete search history.

(56) References Cited

U.S. PATENT DOCUMENTS

| | | | |
|---|---|---|---|
| 7,185,103 B1 * | 2/2007 | Jain | 709/234 |
| 7,193,968 B1 * | 3/2007 | Kapoor et al. | 370/235 |
| 7,536,455 B2 * | 5/2009 | Duffield et al. | 709/223 |
| 2003/0046396 A1 * | 3/2003 | Richter et al. | 709/226 |
| 2004/0199630 A1 * | 10/2004 | Sarkissian et al. | 709/224 |
| 2009/0161570 A1 * | 6/2009 | Duffield et al. | 370/252 |

OTHER PUBLICATIONS

Baek-Young Choi; Jaesung Park; Zhi-Li Zhang, "Adaptive random sampling for traffic load measurement," Communications, 2003. ICC '03. IEEE International Conference on, May 11-15, 2003. pp. 1552-1556 vol. 3.*
Nick Duffield, Carsten Lund, Mikkel Thorup, "Properties and prediction of flow statistics from sampled packet streams," Proceedings of the 2nd ACM SIGCOMM Workshop on Internet measurment, Nov. 6-8, 2002. pp. 159-171.*
Estan, Cristian et al., "Building a Better Netflow," SIGCOMM'04, Aug. 30-Sep. 3, 2004, Portland, Oregon, pp. 245-256.*
Claise, Benoit et al., "IPIX Protocol Specifications," IPFIX IETF-60, Aug. 4, 2004, 20 pages.
Estan, Cristian et al., "Building a Better Netflow," SIGCOMM'04, Aug. 10-Sep. 3, 2004, Portland, Oregon, 12 pages.
Kompella, Ramana Rao et al., "The Power of Slicing in Internet Flow Measurement," Internet Measurement Conference 2005, 13 pages.

* cited by examiner

*Primary Examiner* — Derrick Ferris
*Assistant Examiner* — Christopher R Crompton
(74) *Attorney, Agent, or Firm* — Hickman Palermo Truong & Becker LLP; Edward A. Becker (57) ABSTRACT

An approach for managing the consumption of resources uses adaptive random sampling to decrease the collection of flow statistical data as the consumption of resources increases. When a packet is received from a network, a determination is made whether the packet belongs to an existing flow, for which flow statistical data is being collected, or to a new flow. If the packet belongs to an existing flow, then the flow statistical data for the existing flow is updated to reflect the packet. If the packet belongs to the new flow, then a sampling probability is used to determine whether the new flow is to be sampled. The sampling probability is determined, at least in part, upon a current usage of resources.

40 Claims, 5 Drawing Sheets

APPROACH FOR MANAGING THE CONSUMPTION OF RESOURCES USING ADAPTIVE RANDOM SAMPLING

FIELD OF THE INVENTION

This invention relates generally to networking, and more specifically, to an approach for managing the resources consumed by flow based traffic monitoring using adaptive random packet sampling.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

There are several definitions of the term "flow" being used by the Internet community. Within the context of the IETF's Internet Protocol Information eXport (IPFIX) Working Group, a flow is defined as a set of IP packets passing an observation point in the network during a certain time interval. All packets belonging to a particular flow share a set of common properties. Each property is defined as the result of applying a function to the values of: (1) one or more packet header fields (e.g. destination IP address), transport header fields (e.g. destination port number), or application header fields (e.g. RTP header fields); (2) one or more characteristics of the packet itself (e.g. number of MPLS labels, etc.); or (3) one or more fields derived from packet treatment (e.g. next hop IP address, the output interface, etc.). A packet belongs to a flow if the packet completely satisfies all the defined properties of the flow. This definition covers the range from a flow containing all packets observed at a network interface to a flow consisting of just a single packet between two applications. It includes packets selected by a sampling mechanism.

A variety of flow monitoring tools currently exist to monitor the flow of packets in networks. Flow monitoring tools provide valuable information that can be used in a variety of ways. For example, flow monitoring tools may be used to perform network traffic engineering and to provide network security services, e.g., to detect and address denial of service attacks. As yet another example, flow monitoring tools can be used to support usage-based network billing services.

Flow monitoring tools are conventionally implemented as flow monitoring processes executing on a network element, such as a router. The flow monitoring processes are configured to examine and classify packets passing through a particular observation point in a network. The flow monitoring processes are also configured to generate flow statistical data that indicates, for example, the number of packets in each flow, the number of bytes in each flow and the protocol of each flow.

One of the issues with flow monitoring tools is how to manage the consumption of resources attributable to generating and maintaining flow statistical data. Generating flow statistical data consumes processing resources and storing flow statistical data consumes storage resources. The amount of resources consumed by flow statistical data can be considerable in networks with high traffic volume, which can adversely affect other processes. Furthermore, the amount of resources consumed by flow statistical data can fluctuate dramatically, as network traffic patterns change.

One solution to this problem has been to use sampling to collect flow statistical data for less than all of the packets that pass through an observation point. For example, a percentage of packets are sampled, e.g., every $n^{th}$ packet is sampled, and then the exported flow statistical data is later adjusted to account for the percentage of packets that was sampled. As another example, a fixed probability may be used to determine whether to sample packets. One problem with these approaches is that they do not take into consideration the characteristics of traffic flow. Because of this, it is difficult to select a sampling percentage or probability that works well for both large and small flows. For example, a small sampling probability may work well for large flows but may not be effective for small flows because there may be too few packets to be sampled.

A conventional scheme to control storage consumption is to place a limit on the amount of memory used for storing flow statistical data. The limits are typically expressed as percentages of available resources or as absolute amounts.

One problem with this solution is that it can have significant unintended consequences on processing resource consumption. For example, when new flows arrive at an extremely high rate, because of the memory usage limitation, the existing flow statistical records would have to be removed at a very high rate in order to free up memory space for the new flows. Because export consumes processing resources, this causes processing consumption to surge, which is undesirable. Therefore, this scheme does not address the trade-off between memory and processing resource consumption.

Based on the foregoing, there is a need for an approach for managing the consumption of resources that does not suffer from limitations of prior approaches.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE
III. ADAPTIVE RANDOM SAMPLING
IV. OPERATIONAL EXAMPLE
V. IMPLEMENTATION MECHANISMS

I. Overview

An approach for managing the consumption of resources uses adaptive sampling to decrease the collection of flow statistical data as the consumption of resources increases. According to the approach, when a packet is received from a network, a determination is made whether the packet belongs to an existing flow, for which flow statistical data is being collected, or to a new flow. If the packet belongs to an existing flow, then the packet is always sampled, and the statistical data for the existing flow is updated to reflect the packet. If the packet belongs to a new flow, then a sampling probability is used to determine whether the new flow is to be sampled, i.e., whether statistical data is to be collected for the new flow. The sampling probability is determined, at least in part, upon a current usage of resources. If, based upon the sampling probability, statistical data is to be collected for the new flow, then statistical data that reflects the packet is generated and stored. From then on, the statistical data for the new flow is updated to reflect all additional packets that are received for that flow. A key assumption for this approach is that updating an existing piece of statistical data consumes much less resources than creating a new piece of statistical data. This assumption is generally true in conventional computing environments.

The approach provides control over the amount of resources consumed by flow statistical data, while ensuring that the export of flow statistical data occurs in a deterministic manner. For purposes of explanation, embodiments of the invention are described hereinafter in the context of managing the consumption of memory resources. The approach is not limited to the memory resource context however, and is applicable to any type of resource. For example, the approach is applicable to managing the consumption of processing resources.

II. Architecture

Figure 1:
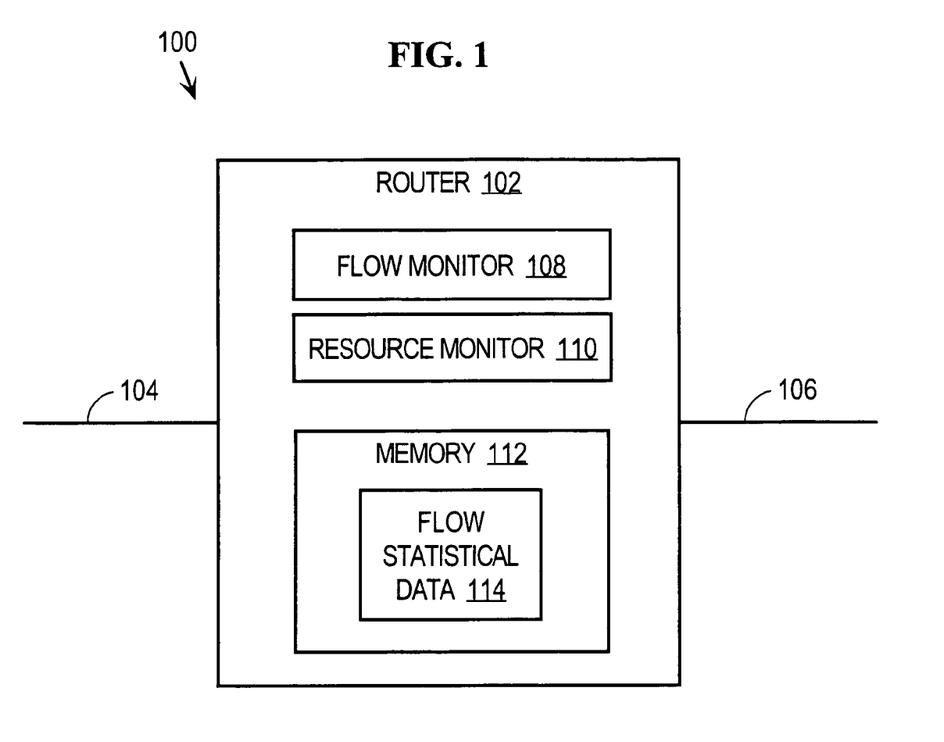
FIG. 1 is a block diagram that depicts an arrangement for managing the consumption of resources using adaptive sampling, according to an embodiment of the invention.

FIG. 1 is a block diagram that depicts an arrangement 100 for managing the consumption of resources using adaptive sampling, according to an embodiment of the invention. Arrangement 100 includes a router 102 that may be communicatively coupled to other network elements via communications links 104, 106. Communications links 104, 106 may be implemented by any mechanism or medium that provides for the exchange of data between router 102 and other network elements. Examples include, without limitation, a network such as a Local Area Network (LAN), Wide Area Network (WAN), Ethernet or the Internet, or one or more terrestrial, satellite or wireless links. For purposes of explanation, embodiments of the invention are described hereinafter in the context of managing the consumption of memory resources on router 102. The approach is not limited to the router context however, and is applicable to any type of network device or element. Examples of such devices include, without limitation, gateways, Web servers, switches and any other type of network device or element.

Router 102 is configured with a flow monitor 108, a resource monitor 110 and a memory 112 with flow statistical data 114. Flow monitor 108 monitors packets passing through router 102 and generates flow statistical data 114. Flow monitor 108 is also configured to export flow statistical data 114 to other network elements (not depicted), such as a flow collector. Resource monitor 110 monitors the consumption of resources on router 102, such as memory 112, CPU resources, or bandwidth, and makes this information available to other elements and processes, such as flow monitor 108. Flow monitor 108 and resource monitor 110 are typically implemented as processes executing on router 102, but may be implemented by hardware or any combination of hardware and software processes. Memory 112 may be any type or combination of mechanisms and media, volatile or non-volatile, that provide for the storage of data. Examples of memory 112 include, without limitation, a random access memory (RAM), a cache, one or more disks, or any combination thereof.

Flow statistical data 114 may include flow statistical data for any number of flows passing through router 102. In practice, flow statistical data 114 may include flow statistical data spanning many orders of magnitude depending upon the amount of traffic router 102 can process. The particular statistical data included in flow statistical data 114 may vary widely, depending upon the requirements of a particular implementation, and the approach is not limited to any particular statistical data. The particular types of data included in flow statistical data 114 may be specific to router 102 and thus different from flow statistical data at other network elements and devices. Router 102 may be configured with other elements and processes, depending upon a particular implementation, that are not depicted in the figures and described herein for purposes of explanation.

Figure 2:
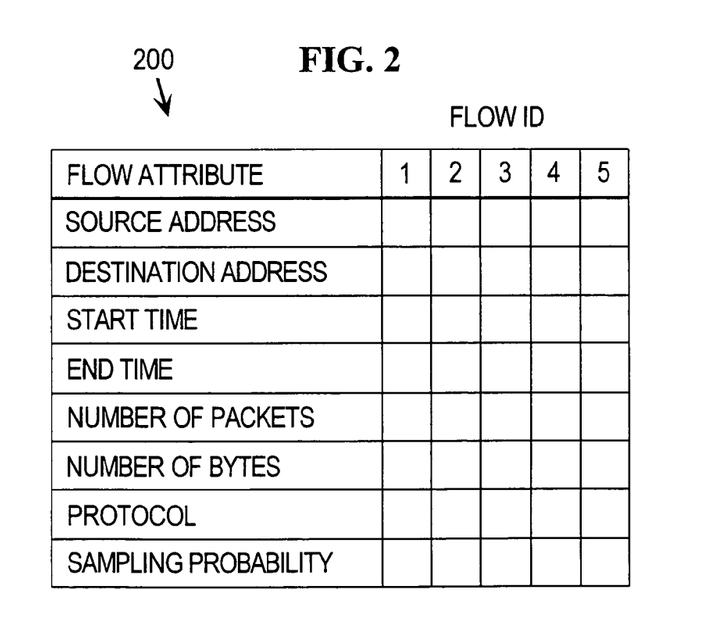
FIG. 2 is a table that depicts an example of flow statistical data for five flows.

FIG. 2 is a table 200 that depicts example flow statistical data 114 for five flows, identified as flows 1-5. Although embodiments of the invention are described herein in the context of flow statistical data 114 being maintained in a table, the approach is not limited to this context and flow statistical data may be stored in any type of data structure or format. Flow monitor 108 generates the data for table 200 by examining the contents of packets passing through router 102. The flow attributes in table 200 include, for each flow, a source address, a destination address, a start time, an end time, a number of packets, a number of bytes, a protocol and a sampling probability. The source address is the source IP address of the flow. The destination address is the destination IP address of the flow. The start time is the time at which the first packet in the flow was received at router 102. The end time is the time at which the latest packet in the flow was received at router 102. The number of packets is the number of packets seen in the flow. The number of bytes is the number of bytes seen in the flow. The protocol is the IP protocol of the flow. Example protocols include, without limitation, at the application layer, hypertext transfer protocol (HTTP); simple mail transfer protocol (SMTP); file transfer protocol (FTP); at the transport layer, transmission control protocol (TCP) and user datagram protocol (UDP); at the network layer, Internet Protocol (IP) and Internet control message protocol (ICMP). Note that only one protocol layer may apply at once. The sampling probability is the probability that was used to determine whether to generate flow statistical data for the flow and is described in more detail hereinafter.

III. Adaptive Random Sampling

As previously described herein, adaptive random sampling is used to manage the consumption of resources. According to this approach, when it is determined that a received packet does not belong to an existing flow, then the packet belongs to a new flow. In this situation, a sampling probability is determined for the new flow. The sampling probability indicates a probability that the new flow will be sampled, i.e., that collection of flow statistical data will be initiated for the new flow. The sampling probability is used to determine whether to generate flow statistical data for a given flow, and is an attribute assigned to and exported with each flow as described in more detail hereinafter.

Figure 3:
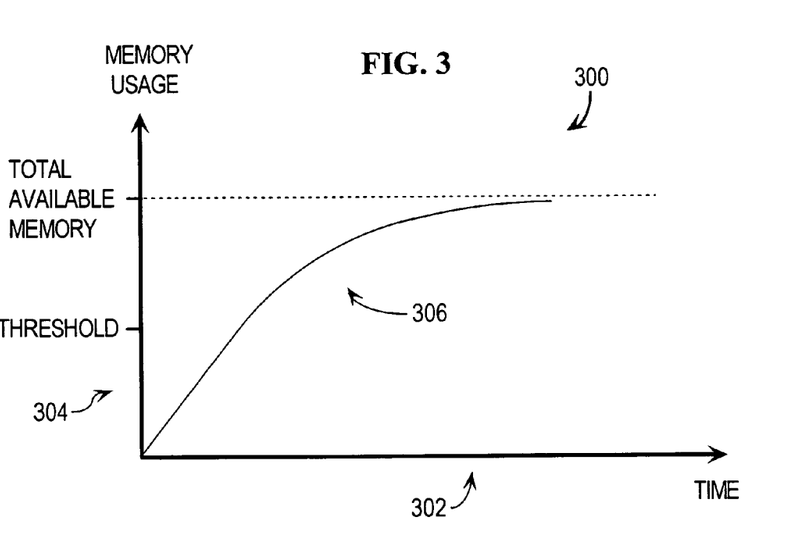
FIG. 3 is a graph that depicts memory consumption behavior using adaptive random sampling without export.

According to one embodiment of the invention, the sampling probability is dynamically adjusted to prevent all available resources from being consumed. FIG. 3 is a graph 300 that depicts the memory consumption behavior using adaptive random sampling without export. The x-axis 302 represents time and the y-axis 304 represents memory usage. The memory usage curve 306 depicts how memory usage asymptotically approaches the total available memory as time approaches infinity. The threshold amount of memory usage is when the adaptive random sampling approach begins to slow the consumption of memory by reducing the sampling probability for packets that belong to new flows.

Figure 4:
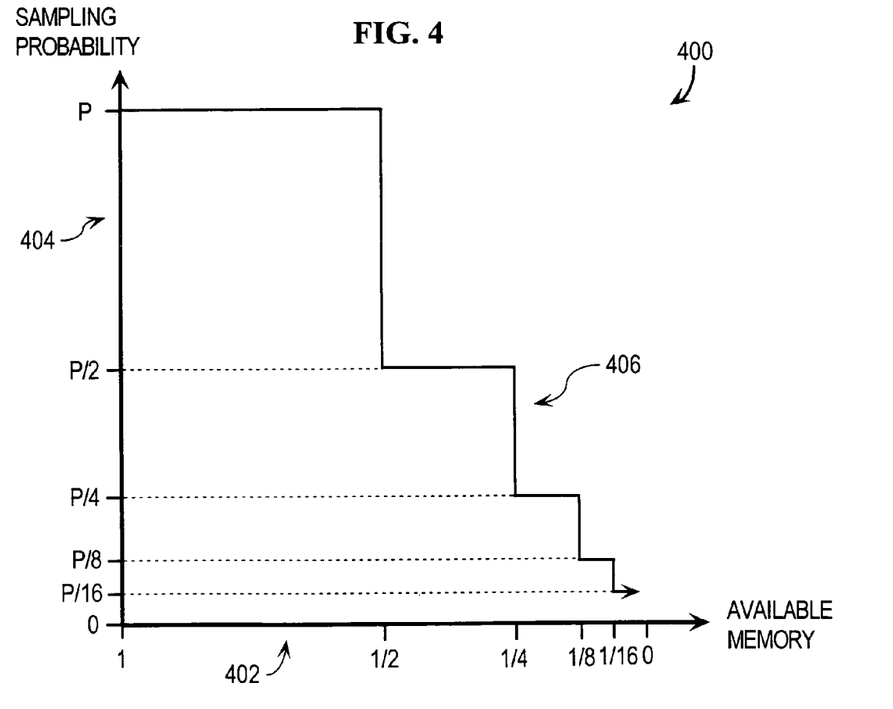
FIG. 4 is a graph of sampling probabilities.

According to one embodiment of the invention, the sampling probability for a new flow is determined based upon the current consumption of memory. FIG. 4 is a graph 400 of sampling probabilities. The x-axis 402 represents the current available memory and the y-axis 404 represents the sampling probability. Line 406 indicates how the sampling probability decreases as the current available memory decreases. The value of P is the base sampling probability and may be any value between zero and one, for example, one. M is the maximum available memory.

In this example, line 406 represents a step function where the sampling probability is reduced by 50% for each 50% reduction in available memory. Thus, the first 50% reduction in available memory (to ½ of the available memory) corresponds to a 50% reduction in sampling probability to P/2. The next 50% reduction in available memory (to ¼ of the available memory) corresponds to another 50% reduction in sampling probability to P/4, and so on. Starting with a full available memory and assuming a base probability of P=1 (the base probability may be any value between 0 and 1), a sampling probability of one is used to determine whether to initiate collection of flow statistical data for new flows. In this situation, flow statistical data collection is initiated for all new flows until the available memory is reduced by one half. At that point, the sampling probability used for new flows is reduced by 50%, making it less likely that flow statistical data collection will be initiated for new flows. This process continues with a 50% reduction being made in sampling probability for each 50% reduction in available memory.

Once the sampling probability has been determined for a packet that belongs to a new flow, then a determination is made, based upon the sampling probability, whether statistical data collection should be initiated for the new flow. For example, a random number generator may be used to determine whether the packet should be sampled and the collection of statistical data should be initiated for the new flow, given the sampling probability determined for the packet.

The result of using adaptive random sampling as described herein is that as the available memory decreases, the number of new flows for which collection of statistical data is initiated decreases. This behavior may be characterized by the memory consumption asymptotically approaching, but never reaching, the total available memory, as depicted in FIG. 3. The greater the number of packets in a new flow, the better the chances that statistical data will be collected for the new flow. Eventually however, as the memory consumption approaches the total available memory, even new flows with large numbers of packets will not be selected for sampling, because the sampling probabilities will be so low. Based upon statistics and probability theory, where each packet is independently sampled with probability p, the probability (Q) that the collection of flow statistical data will be initiated for a flow of N packets is defined by: $Q\{k>=1\}=1-(1-p)^N$, where k is the total number of sampled packets in the flow.

Figure 5:
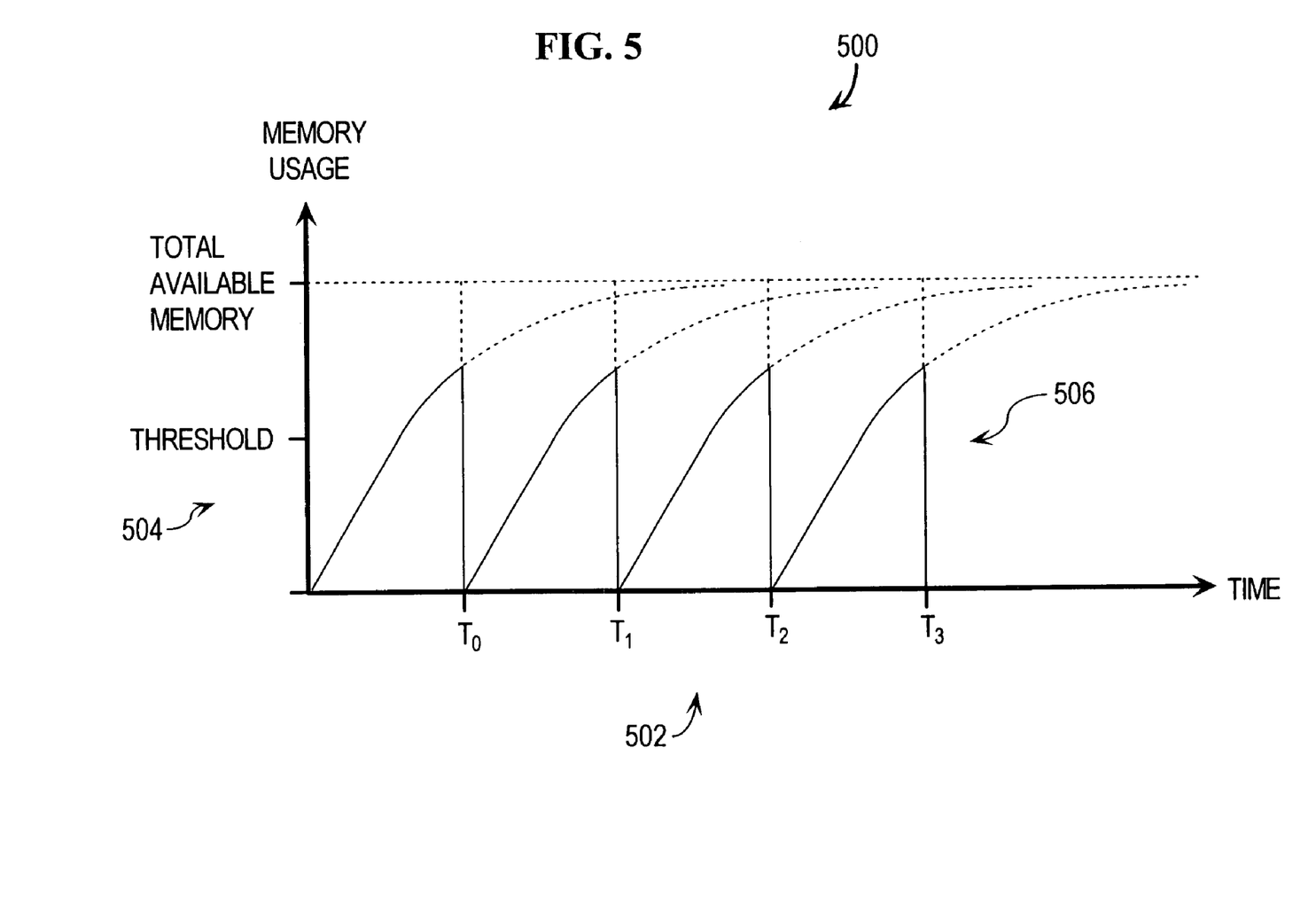
FIG. 5 is a graph of memory consumption over time using adaptive random sampling.

At some point, flow statistical data is exported from the memory, which increases the amount of available memory. Assuming all of the flow statistical data is exported, then the base sampling probability is assigned to the next new flow, since all of the memory will be available. FIG. 5 is a graph 500 of memory usage, i.e., the amount of memory consumed, over time using the adaptive random sampling approach described herein, with export of all flow statistical data at equal time intervals $T_0$-$T_3$. The x-axis 502 represents time and the y-axis 504 represents the memory usage. Line 506 indicates how, using the adaptive random sampling approach described herein, the memory usage approaches a threshold level and then begins asymptotically heading towards the total available memory until an export occurs at the end of each time window. The use of the adaptive random sampling approach provides predictable behavior with well-defined windows that include complete data, which allows proper statistical analysis of flow statistical data. Although FIG. 5 depicts an example where all flow statistical data is exported at once, the approach is not limited to this context and is applicable to any export scenario. This includes export scenarios where less than all of the flow statistical data is exported during an export. For example, the approach is applicable to implementations that selectively export flow statistical data on a per flow basis. In this situation, the sampling probability assigned to the next new flow may, or may not be, the base sampling probability, depending upon the amount of memory available after the export and the function used to determine the sampling probability. The invention is not limited to the step function depicted in FIG. 4 and described herein to determine sampling probabilities. A wide variety of functions with varying characteristics and curves may be used depending upon the implementation. Furthermore, although FIG. 5 depicts the export of flow statistical data occurring at equal time intervals, the approach is not limited to this context and is applicable to exports occurring at any time for any reason.

IV. Operational Example

Figure 6:
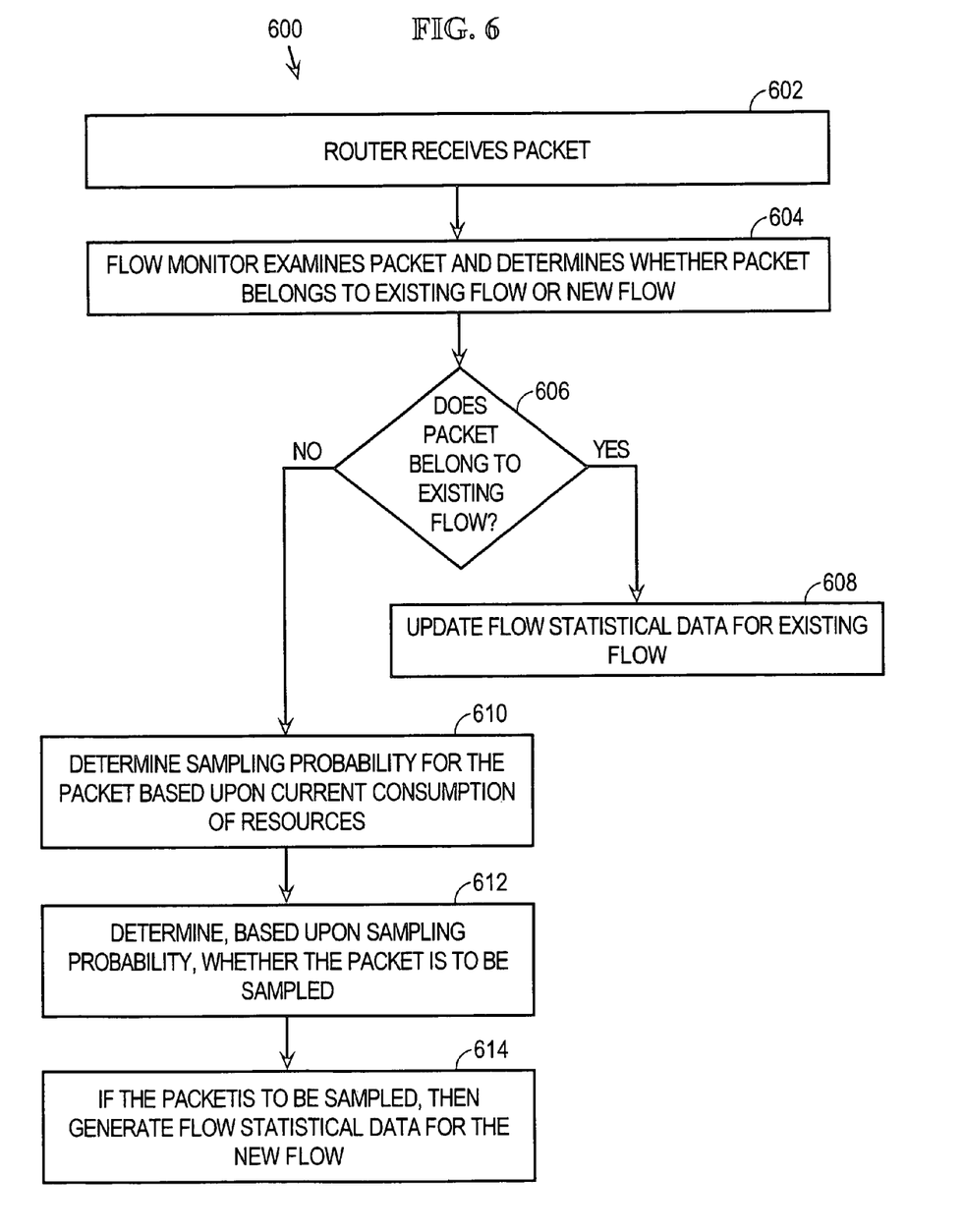
FIG. 6 is a flow diagram that depicts an approach for managing the consumption of resources using adaptive sampling according to an embodiment of the invention.

FIG. 6 is a flow diagram 600 that depicts an approach for managing the consumption of resources using adaptive sampling according to an embodiment of the invention. In step 602, router 102 receives a packet. In step 604, flow monitor 108 examines the packet and determines whether the packet belongs to an existing flow or a new flow. Flow monitor 108 makes this determination by comparing attributes of the packet to attributes of existing flows for which flow statistical data is currently being collected. For example, flow monitor 108 may compare the source and destination address of the packet to source and destination addresses for existing flows in table 200. If the source and destination address of the packet match the source and destination address of a flow, then the packet belongs to that flow. Other attributes may also be used to make the determination.

In step 606, if the packet belongs to an existing flow, then in step 608, the statistical data for the existing flow is updated to reflect the packet. For example, flow monitor 108 updates the flow attributes in table 200 for the existing flow to reflect the packet. This may include, for example, updating the end time, number of packets and the number of bytes to reflect the packet. Updating flow statistical data incurs no storage penalty since additional packets only affect the flow attribute values for a flow entry in table 200.

If, in step 606, the packet does not belong to an existing flow and instead belongs to a new flow, then in step 610, a sampling probability is determined for the packet based upon the current consumption of resources. In the present example, a sampling probability is determined for the packet based upon the current consumption of memory 112, as indicated by resource monitor 110.

In step 612, a determination is made whether, based upon the determined sampling probability, the packet is to be sampled, i.e., that collection of statistical data for the new flow is to be initiated. Suppose that in step 610, resource monitor 110 indicated that the amount of available memory 112 was between ¼ and ½ and the sampling probability was therefore determined to be ½ (for a base sampling probability of P=1). A random number generator may be used to generate a number between zero and ten. If the result is between zero and five, then the new flow is sampled. If the result is between five and ten, then the new flow is not sampled. Other ranges may be used, depending upon a particular implementation. Furthermore, other techniques may be used to determine whether a packet should be sampled, given a sampling probability for the packet.

In step 614, if the packet belonging to a new flow is to be sampled, then statistical data is generated for the new flow. For example, a new entry may be added to table 200 for the new flow and the corresponding flow attributes determined based upon the packet. From then on, all subsequent packets that belong to the flow will be sampled. According to one embodiment of the invention, the attributes include the sampling probability that will also be exported along with the statistical data for each flow. The per flow sampling probability allows external applications to normalize the flow statistical data in order to compare across flows that have different sampling probabilities attached.

If, in step 612, a determination is made that the packet is not to be sampled, then flow statistical data is not generated for the flow. When the next packet that belongs to the same flow is received, a new sampling probability is determined for this packet, based upon the then current consumption of resources. This sampling probability may be the same or different than the sampling probability for the first packet that was not sampled.

V. Implementation Mechanisms

As previously mentioned herein, the approach is applicable to any type of resources, such as memory resources and processing resources. The approach may also be based upon the amount of time left in a current fixed export window until the next export occurs. In this situation, the sampling probability for a new flow is determined based upon an amount of time remaining (percentage or absolute amount) until the next scheduled export of flow statistical data.

The approach described herein may be implemented in a variety of mechanisms/processes and contexts and the invention is not limited to any particular mechanism/process or context. The approach may be implemented in any environment where sampling is performed. For example, the approach may be implemented in flow monitor 108, or some other process executing on router 102. Furthermore, any portion of the approach may be implemented in hardware, computer software or any combination of hardware and computer software.

Figure 7:
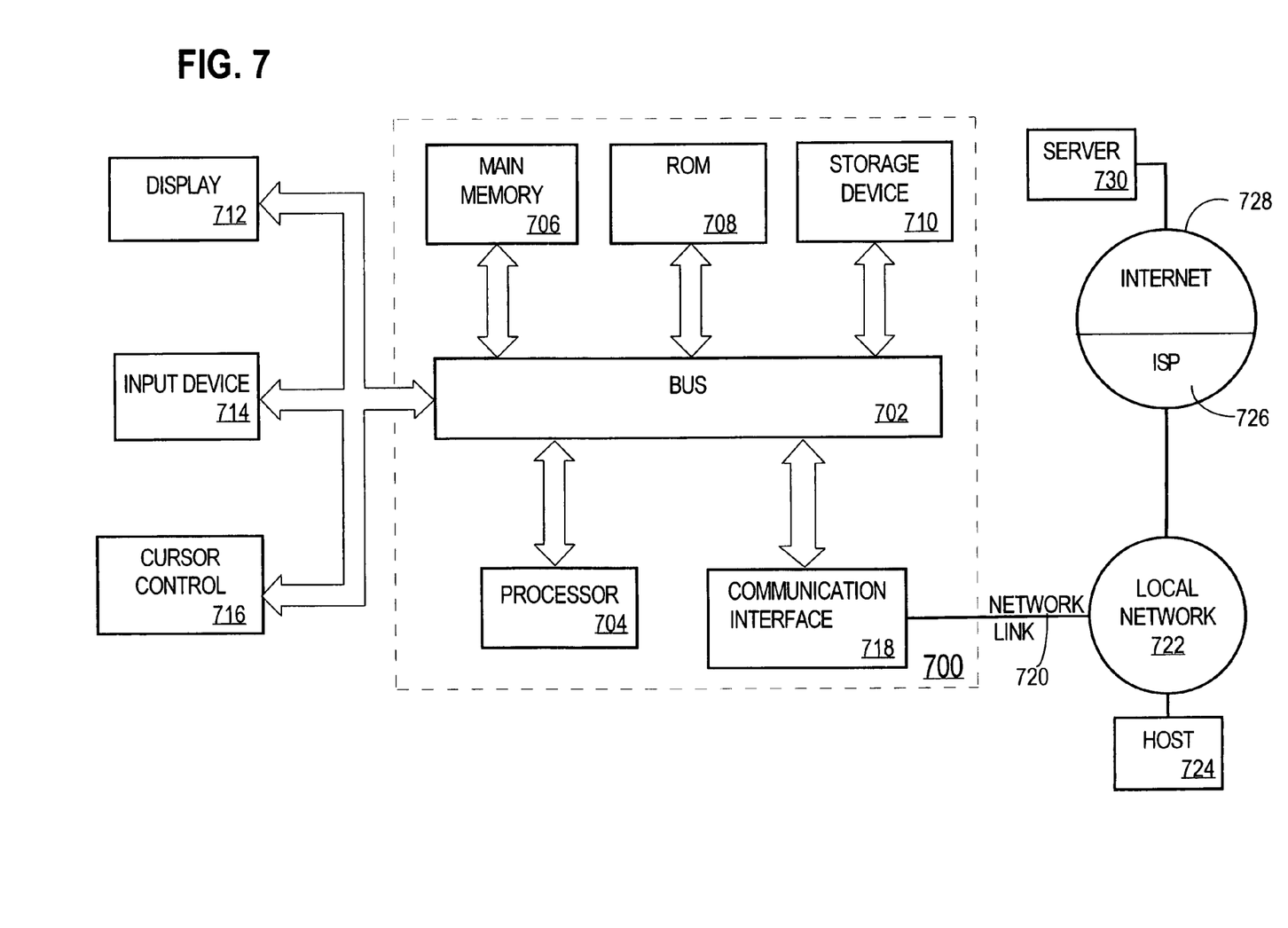
FIG. 7 is a block diagram of a computer system on which embodiments of the invention may be implemented.

When implemented in a software process, such as flow monitor 108, the process may execute on any type of computing architecture or platform. FIG. 7 is a block diagram that illustrates an example computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for processing packets in a network, the computer-implemented method comprising:
    receiving a first packet from a network;
    determining whether the first packet belongs to an existing flow, for which flow statistical data is being collected, or a first new flow, for which flow statistical data is not yet being collected;
    if the first packet belongs to the existing flow for which statistical data is being collected, then updating the flow statistical data in a memory of a network device for the existing flow to reflect the first packet;
    in response to determining that the first packet belongs to the first new flow for which statistical data is not yet being collected, then
        selectively determining a first sampling probability for the new flow based upon a first current usage of the memory of the network device without changing sampling rates for one or more existing flows, and
        determining, based upon the first sampling probability, whether flow statistical data is to be collected for the first new flow; and
        if, based upon the first sampling probability, flow statistical data is to be collected for the first new flow, then generating and storing in the memory of the network device for the first new flow, flow statistical data that reflects the first packet, wherein the first sampling probability for the new flow is different than a sampling probability for the existing flow for which flow statistical data is being collected.

2. The computer-implemented method as recited in claim 1, wherein the first current usage of the memory indicates an amount of the memory that is available and the first sampling probability is determined based upon whether the amount of the memory that is available is below a specified threshold.

3. The computer-implemented method as recited in claim 1, further comprising:
    receiving, from the network, a second packet that belongs to the first new flow;
    determining whether flow statistical data is currently being collected for the first new flow;
    if flow statistical data is currently being collected for the first new flow, then updating the flow statistical data for the first new flow to reflect the second packet; and
    if flow statistical data is not currently being collected for the first new flow, then
    selectively determining a second sampling probability for the first new flow based upon a second current usage of the memory,
    using the second sampling probability to determine whether flow statistical data is to be collected for the first new flow, and
    if, based upon the second sampling probability, flow statistical data is to be collected for the first new flow, then generating and storing in the memory flow statistical data for the first new flow that reflects the second packet.

4. The computer-implemented method as recited in claim 3, wherein the second current usage of the memory indicates an equal to or lower amount of available memory relative to the first current usage of the memory and the second sampling probability is equal to or lower than the first sampling probability.

5. The computer-implemented method as recited in claim 3, wherein the second current usage of the memory indicates a greater amount of available memory relative to the first current usage of the memory and the second sampling probability is greater than the first sampling probability.

6. The computer-implemented method as recited in claim 1, further comprising:
    receiving, from the network, a second packet that belongs to a second new flow for which flow statistical data is not currently being collected;
    selectively determining a second sampling probability for the second new flow based upon a second current usage of the memory;
    using the second sampling probability to determine whether flow statistical data is to be collected for the second new flow; and
    if, based upon the second sampling probability, flow statistical data is to be collected for the second new flow, then generating and storing in the memory flow statistical data for the second new flow that reflects the second packet.

7. The computer-implemented method as recited in claim 6, wherein the second current usage of the memory indicates an equal to or lower amount of available memory relative to the first current usage of the memory and the second sampling probability is equal to or lower than the first sampling probability.

8. The computer-implemented method as recited in claim 1, further comprising including the first sampling probability in the flow statistical data for the new flow.

9. A non-transitory computer-readable memory for processing
packets in a network, the non-transitory computer-readable memory storing instructions which, when executed by one or more processors, cause:
receiving a first packet from a network;
determining whether the first packet belongs to an existing flow, for which flow statistical data is being collected, or a first new flow, for which flow statistical data is not yet being collected;
if the first packet belongs to the existing flow for which statistical data is being collected, then updating the flow statistical data in a memory of a network device for the existing flow to reflect the first packet;
in response to determining that the first packet belongs to the first new flow for which statistical data is not yet being collected, then
selectively determining a first sampling probability for the new flow based upon a first current usage of the memory of the network device without changing sampling rates for one or more existing flows, and
determining, based upon the first sampling probability, whether flow statistical data is to be collected for the first new flow; and
if, based upon the first sampling probability, flow statistical data is to be collected for the first new flow, then generating and storing in the memory of the network device for the first new flow, flow statistical data that reflects the first packet, wherein the first sampling probability for the new flow is different than a sampling probability for the existing flow for which flow statistical data is being collected.

10. The non-transitory computer-readable memory as recited in claim 9, wherein the first current usage of the memory indicates an amount of the memory that is available and the first sampling probability is determined based upon whether the amount of the memory that is available is below a specified threshold.

11. The non-transitory computer-readable memory as recited in claim 9, further storing additional instructions which, when executed by the one or more processors, cause:
receiving, from the network, a second packet that belongs to the first new flow;
determining whether flow statistical data is currently being collected for the first new flow;
if flow statistical data is currently being collected for the first new flow, then updating the flow statistical data for the first new flow to reflect the second packet; and
if flow statistical data is not currently being collected for the first new flow, then
selectively determining a second sampling probability for the first new flow based upon a second current usage of the memory,
using the second sampling probability to determine whether flow statistical data is to be collected for the first new flow, and
if, based upon the second sampling probability, flow statistical data is to be collected for the first new flow, then generating and storing in the memory flow statistical data for the first new flow that reflects the second packet.

12. The non-transitory computer-readable memory as recited in claim 11, wherein the second current usage of the memory indicates an equal to or lower amount of available memory relative to the first current usage of the memory and the second sampling probability is equal to or lower than the first sampling probability.

13. The non-transitory computer-readable memory as recited in claim 11, wherein the second current usage of the memory indicates a greater amount of available memory relative to the first current usage of the memory and the second sampling probability is greater than the first sampling probability.

14. The non-transitory computer-readable memory as recited in claim 9, further storing additional instructions which, when executed by the one or more processors, cause:
receiving, from the network, a second packet that belongs to a second new flow for which flow statistical data is not currently being collected;
selectively determining a second sampling probability for the second new flow based upon a second current usage of the memory;
using the second sampling probability to determine whether flow statistical data is to be collected for the second new flow; and
if, based upon the second sampling probability, flow statistical data is to be collected for the second new flow, then generating and storing in the memory flow statistical data for the second new flow that reflects the second packet.

15. The non-transitory computer-readable memory as recited in claim 14, wherein the second current usage of the memory indicates an equal to or lower amount of available memory relative to the first current usage of the memory and the second sampling probability is equal to or lower than the first sampling probability.

16. The non-transitory computer-readable memory as recited in claim 9, further storing additional instructions which, when executed by the one or more processors, cause including the first sampling probability in the flow statistical data for the new flow.

17. An apparatus for processing packets in a network, the apparatus comprising a non-transitory memory storing instructions which, when executed by one or more processors, cause:
receiving a first packet from a network;
determining whether the first packet belongs to an existing flow, for which flow statistical data is being collected, or a first new flow, for which flow statistical data is not yet being collected;
if the first packet belongs to the existing flow for which statistical data is being collected, then updating the flow statistical data in a memory of a network device for the existing flow to reflect the first packet;
in response to determining that the first packet belongs to the first new flow for which statistical data is not yet being collected, then
selectively determining a first sampling probability for the new flow based upon a first current usage of the memory of the network device without changing sampling rates for one or more existing flows, and
determining, based upon the first sampling probability, whether flow statistical data is to be collected for the first new flow; and
if, based upon the first sampling probability, flow statistical data is to be collected for the first new flow, then generating and storing in the memory of the network device for the first new flow, flow statistical data that reflects the first packet, wherein the first sampling probability for the new flow is different than a sampling probability for the existing flow for which flow statistical data is being collected.

18. The apparatus as recited in claim 17, wherein the first current usage of the memory indicates an amount of the memory that is available and the first sampling probability is determined based upon whether the amount of the memory that is available is below a specified threshold.

19. The apparatus as recited in claim 17, wherein the non-transitory memory stores additional instructions which, when executed by the one or more processors, cause:
receiving, from the network, a second packet that belongs to the first new flow;
determining whether flow statistical data is currently being collected for the first new flow;
if flow statistical data is currently being collected for the first new flow, then updating the flow statistical data for the first new flow to reflect the second packet; and
if flow statistical data is not currently being collected for the first new flow, then
selectively determining a second sampling probability for the first new flow based upon a second current usage of the memory,
using the second sampling probability to determine whether flow statistical data is to be collected for the first new flow, and
if, based upon the second sampling probability, flow statistical data is to be collected for the first new flow, then generating and storing in the memory flow statistical data for the first new flow that reflects the second packet.

20. The apparatus as recited in claim 19, wherein the second current usage of the memory indicates an equal to or lower amount of available memory relative to the first current usage of the memory and the second sampling probability is equal to or lower than the first sampling probability.

21. The apparatus as recited in claim 19, wherein the second current usage of the memory indicates a greater amount of available memory relative to the first current usage of the memory and the second sampling probability is greater than the first sampling probability.

22. The apparatus as recited in claim 17, wherein the non-transitory memory stores additional instructions which, when executed by the one or more processors, cause:
receiving, from the network, a second packet that belongs to a second new flow for which flow statistical data is not currently being collected;
selectively determining a second sampling probability for the second new flow based upon a second current usage of the memory;
using the second sampling probability to determine whether flow statistical data is to be collected for the second new flow; and
if, based upon the second sampling probability, flow statistical data is to be collected for the second new flow, then generating and storing in the memory flow statistical data for the second new flow that reflects the second packet.

23. The apparatus as recited in claim 22, wherein the second current usage of the memory indicates an equal to or lower amount of available memory relative to the first current usage of the memory and the second sampling probability is equal to or lower than the first sampling probability.

24. The apparatus as recited in claim 17, wherein the non-transitory memory stores additional instructions which, when executed by the one or more processors, cause including the first sampling probability in the flow statistical data for the new flow.

25. An apparatus for processing packets in a network, the apparatus comprising:
means for receiving a first packet from a network;
means for determining whether the first packet belongs to an existing flow, for which flow statistical data is being collected, or a first new flow, for which flow statistical data is not yet being collected;
means for if the first packet belongs to an existing flow for which statistical data is being collected, then updating the flow statistical data in the memory for the existing flow to reflect the first packet;
means for in response to determining that the first packet belongs to the first new flow for which statistical data is not yet being collected, then
selectively determining a first sampling probability for the new flow based upon a first current usage of the memory of the network device without changing sampling rates for one or more existing flows, and
determining, based upon the first sampling probability, whether flow statistical data is to be collected for the first new flow; and
means for if, based upon the first sampling probability, flow statistical data is to be collected for the first new flow, then generating and storing in the memory for the first new flow, flow statistical data that reflects the first packet, wherein the first sampling probability for the new flow is different than a sampling probability for the existing flow for which flow statistical data is being collected.

26. The apparatus as recited in claim 25, wherein the first current usage of the memory indicates an amount of the memory that is available and the first sampling probability is determined based upon whether the amount of the memory that is available is below a specified threshold.

27. The apparatus as recited in claim 25, further comprising:
means for receiving, from the network, a second packet that belongs to the first new flow;
means for determining whether flow statistical data is currently being collected for the first new flow;
means for if flow statistical data is currently being collected for the first new flow, then updating the flow statistical data for the first new flow to reflect the second packet; and
means for if flow statistical data is not currently being collected for the first new flow, then
selectively determining a second sampling probability for the first new flow based upon a second current usage of the memory,
using the second sampling probability to determine whether flow statistical data is to be collected for the first new flow, and
if, based upon the second sampling probability, flow statistical data is to be collected for the first new flow, then generating and storing in the memory flow statistical data for the first new flow that reflects the second packet.

28. The apparatus as recited in claim 27, wherein the second current usage of the memory indicates an equal to or lower amount of available memory relative to the first current usage of the memory and the second sampling probability is equal to or lower than the first sampling probability.

29. The apparatus as recited in claim 27, wherein the second current usage of the memory indicates a greater amount of available memory relative to the first current usage of the memory and the second sampling probability is greater than the first sampling probability.

30. The apparatus as recited in claim 25, further comprising:
means for receiving, from the network, a second packet that belongs to a second new flow for which flow statistical data is not currently being collected;
means for selectively determining a second sampling probability for the second new flow based upon a second current usage of the memory;
means for using the second sampling probability to determine whether flow statistical data is to be collected for the second new flow; and
means for if, based upon the second sampling probability, flow statistical data is to be collected for the second new flow, then generating and storing in the memory flow statistical data for the second new flow that reflects the second packet.

31. The apparatus as recited in claim 30, wherein the second current usage of the memory indicates an equal to or lower amount of available memory relative to the first current usage of the memory and the second sampling probability is equal to or lower than the first sampling probability.

32. The apparatus as recited in claim 25, further comprising means for including the first sampling probability in the flow statistical data for the new flow.

33. A computer-implemented method for processing packets in a network, the computer-implemented method comprising:
receiving a first packet from a network;
determining whether the first packet belongs to an existing flow, for which flow statistical data is being collected, or a first new flow, for which flow statistical data is not yet being collected;
if the first packet belongs to an existing flow for which statistical data is being collected, then updating the flow statistical data in a memory of a network device for the existing flow to reflect the first packet;
in response to determining that the first packet belongs to the first new flow for which statistical data is not yet being collected, then
selectively determining a first sampling probability for the first new flow based upon an amount of time remaining in a current export window without changing sampling rates for one or more existing flows, and determining, based upon the first sampling probability, whether flow statistical data is to be collected for the first new flow; and
if, based upon the first sampling probability, flow statistical data is to be collected for the first new flow, then generating and storing in the memory of the network device for the first new flow, flow statistical data that reflects the first packet, wherein the first sampling probability for the new flow is different than a sampling probability for the existing flow for which flow statistical data is being collected.

34. A non-transitory computer-readable memory for processing packets in a network, the non-transitory computer-readable memory storing instructions which, when executed by one or more processors, cause:
receiving a first packet from a network;
determining whether the first packet belongs to an existing flow, for which flow statistical data is being collected, or a first new flow, for which flow statistical data is not yet being collected;
if the first packet belongs to the existing flow for which statistical data is being collected, then updating the flow statistical data in the memory for the existing flow to reflect the first packet;
in response to determining that the first packet belongs to the first new flow for which statistical data is not yet being collected, then
selectively determining a first sampling probability for the first new flow based upon an amount of time remaining in a current export window without changing sampling rates for one or more existing flows, and determining, based upon the first sampling probability, whether flow statistical data is to be collected for the first new flow; and
if, based upon the first sampling probability, flow statistical data is to be collected for the first new flow, then generating and storing in the memory of the network device for the first new flow, flow statistical data that reflects the first packet, wherein the first sampling probability for the new flow is different than a sampling probability for the existing flow for which flow statistical data is being collected.

35. An apparatus for processing packets in a network, the apparatus comprising a non-transitory memory storing instructions which, when executed by one or more processors, cause:
receiving a first packet from a network;
determining whether the first packet belongs to an existing flow, for which flow statistical data is being collected, or a first new flow, for which flow statistical data is not yet being collected;
if the first packet belongs to the existing flow for which statistical data is being collected, then updating the flow statistical data in the memory for the existing flow to reflect the first packet;
in response to determining that the first packet belongs to the first new flow for which statistical data is not yet being collected, then
selectively determining a first sampling probability for the first new flow based upon an amount of time remaining in a current export window without changing sampling rates for one or more existing flows, and
determining, based upon the first sampling probability, whether flow statistical data is to be collected for the first new flow; and
if, based upon the first sampling probability, flow statistical data is to be collected for the first new flow, then generating and storing in the memory for the first new flow, flow statistical data that reflects the first packet, wherein the first sampling probability for the new flow is different than a sampling probability for the existing flow for which flow statistical data is being collected.

36. An apparatus for processing packets in a network, the apparatus comprising:
means for receiving a first packet from a network;
means for determining whether the first packet belongs to an existing flow, for which flow statistical data is being collected, or a first new flow, for which flow statistical data is not yet being collected;
means for if the first packet belongs to the existing flow for which statistical data is being collected, then updating the flow statistical data in at-he memory of a network device for the existing flow to reflect the first packet;
means for in response to determining that the first packet belongs to the first new flow for which statistical data is not yet being collected, then selectively determining a first sampling probability for the first new flow based upon an amount of time remaining in a current export window without changing sampling rates for one or more existing flows, and determining, based upon the first sampling probability, whether flow statistical data is to be collected for the first new flow; and means for if, based upon the first sampling probability, flow statistical data is to be collected for the first new flow, then generating and storing in the memory of the network device for the first new flow, flow statistical data that reflects the first packet, wherein the first sampling probability for the new flow is different than a sampling probability for the existing flow for which flow statistical data is being collected.

37. A computer-implemented method for processing packets in a network, the computer-implemented method comprising:

receiving a first packet from a network;

determining whether the first packet belongs to an existing flow, for which flow statistical data is being collected, or a first new flow, for which flow statistical data is not yet being collected;

if the first packet belongs to the existing flow for which statistical data is being collected, then updating the flow statistical data in a memory of a network device for the existing flow to reflect the first packet;

in response to determining that the first packet belongs to the first new flow for which statistical data is not yet being collected, then selectively determining a first sampling probability for the first new flow based upon a current usage of processing resources without changing sampling rates for one or more existing flows, and determining, based upon the first sampling probability, whether flow statistical data is to be collected for the first new flow; and if, based upon the first sampling probability, flow statistical data is to be collected for the first new flow, then generating and storing in the memory of the network device for the first new flow, flow statistical data that reflects the first packet, wherein the first sampling probability for the new flow is different than a sampling probability for the existing flow for which flow statistical data is being collected.

38. A non-transitory computer-readable memory for processing packets in a network, the non-transitory computer-readable memory storing instructions which, when executed by one or more processors, cause:

receiving a first packet from a network;

determining whether the first packet belongs to an existing flow, for which flow statistical data is being collected, or a first new flow, for which flow statistical data is not yet being collected;

if the first packet belongs to the existing flow for which statistical data is being collected, then updating the flow statistical data in the memory for the existing flow to reflect the first packet;

in response to determining that the first packet belongs to the first new flow for which statistical data is not yet being collected, then selectively determining a first sampling probability for the first new flow based upon a current usage of processing resources without changing sampling rates for one or more existing flows, and determining, based upon the first sampling probability, whether flow statistical data is to be collected for the first new flow; and if, based upon the first sampling probability, flow statistical data is to be collected for the first new flow, then generating and storing in the memory for the first new flow, flow statistical data that reflects the first packet, wherein the first sampling probability for the new flow is different than a sampling probability for the existing flow for which flow statistical data is being collected.

39. An apparatus for processing packets in a network, the apparatus comprising a non-transitory memory storing instructions which, when executed by one or more processors, cause:

receiving a first packet from a network;

determining whether the first packet belongs to an existing flow, for which flow statistical data is being collected, or a first new flow, for which flow statistical data is not yet being collected;

if the first packet belongs to an existing flow for which statistical data is being collected, then updating the flow statistical data in the memory for the existing flow to reflect the first packet;

in response to determining that the first packet belongs to the first new flow for which statistical data is not yet being collected, then selectively determining a first sampling probability for the first new flow based upon a current usage of processing resources without changing sampling rates for one or more existing flows, and determining, based upon the first sampling probability, whether flow statistical data is to be collected for the first new flow; and if, based upon the first sampling probability, flow statistical data is to be collected for the first new flow, then generating and storing in the memory for the first new flow, flow statistical data that reflects the first packet, wherein the first sampling probability for the new flow is different than a sampling probability for the existing flow for which flow statistical data is being collected.

40. An apparatus for processing packets in a network, the apparatus comprising:

means for receiving a first packet from a network;

means for determining whether the first packet belongs to an existing flow, for which flow statistical data is being collected, or a first new flow, for which flow statistical data is not yet being collected;

means for if the first packet belongs to the existing flow for which statistical data is being collected, then updating the flow statistical data in the memory for the existing flow to reflect the first packet;

means for in response to determining that the first packet belongs to the first new flow for which statistical data is not yet being collected, then selectively determining a first sampling probability for the first new flow based upon a current usage of processing resources without changing sampling rates for one or more existing flows, and determining, based upon the first sampling probability, whether flow statistical data is to be collected for the first new flow; and means for if, based upon the first sampling probability, flow statistical data is to be collected for the first new flow, then generating and storing in the memory for the first new flow, flow statistical data that reflects the first packet, wherein the first sampling probability for the new flow is different than a sampling probability for the existing flow for which flow statistical data is being collected.

* * * * *